United States Patent
Kumano et al.

(10) Patent No.: US 9,619,717 B2
(45) Date of Patent: Apr. 11, 2017

(54) LANE-LINE RECOGNITION APPARATUS

(71) Applicant: DENSO CORPORATION, Kariya, Aichi-pref. (JP)

(72) Inventors: Syunya Kumano, Gothenburg (SE); Naoki Kawasaki, Kariya (JP); Shunsuke Suzuki, Aichi-ken (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 7 days.

(21) Appl. No.: 14/621,780

(22) Filed: Feb. 13, 2015

(65) Prior Publication Data

US 2015/0235090 A1    Aug. 20, 2015

(30) Foreign Application Priority Data

Feb. 14, 2014    (JP) .................................. 2014-026595

(51) Int. Cl.
*G08B 21/00*    (2006.01)
*G06K 9/00*    (2006.01)

(52) U.S. Cl.
CPC ............................... *G06K 9/00798* (2013.01)

(58) Field of Classification Search
CPC ................................................. G06K 9/00798
USPC ........................................................ 340/435
See application file for complete search history.

(56) References Cited

U.S. PATENT DOCUMENTS

| 5,555,312 A | 9/1996 | Shima et al. |
| 6,466,684 B1 * | 10/2002 | Sasaki ................ G06T 7/2033 340/435 |
| 2013/0190981 A1 * | 7/2013 | Dolinar ................ B60R 11/04 701/41 |
| 2014/0118552 A1 * | 5/2014 | Takahama .......... G06K 9/00798 348/148 |

FOREIGN PATENT DOCUMENTS

| JP | 05-164569 | 6/1993 |
| JP | H06-119594 | 4/1994 |
| JP | H07-28975 | 1/1995 |
| JP | 2003-331295 | 11/2003 |
| JP | 2004-326214 | 11/2004 |
| JP | 2004-326559 | 11/2004 |

OTHER PUBLICATIONS

Office Action dated Jan. 26, 2016 in corresponding Japanese Application No. 2014-026595 with English translation.

* cited by examiner

*Primary Examiner* — Mark Rushing
(74) *Attorney, Agent, or Firm* — Harness, Dickey & Pierce, P.L.C.

(57) ABSTRACT

An apparatus for recognizing lane lines including a broken line. An image capture unit is configured to acquire an image of the surroundings including a roadway ahead of a subject vehicle. An edge-point extractor is configured to extract edge points in the image. An first-edge-point detector is configured to detect first edge points facing at least one missing section of a broken line in the edge points extracted by the edge-point extractor. A lane-line recognizes is configured to recognize a lane line using the edge points extracted by the edge-point extractor other than all or some of the first edge points.

4 Claims, 7 Drawing Sheets

LANE-LINE RECOGNITION APPARATUS

CROSS-REFERENCE TO RELATED APPLICATION

This application is based on and claims the benefit of priority from earlier Japanese Patent Applications No. 2014-26595 filed Feb. 14, 2014, the descriptions of which are incorporated herein by reference.

BACKGROUND

Technical Field

The present invention relates to a lane-line recognition apparatus.

Related Art

A known technique as disclosed in Japanese Patent Application Laid-Open Publication No. 1993-164569 is configured to extract edge points in an image ahead of a subject vehicle captured by a vehicle-mounted camera and recognize a lane line based on the extracted edge points.

Figure 11:
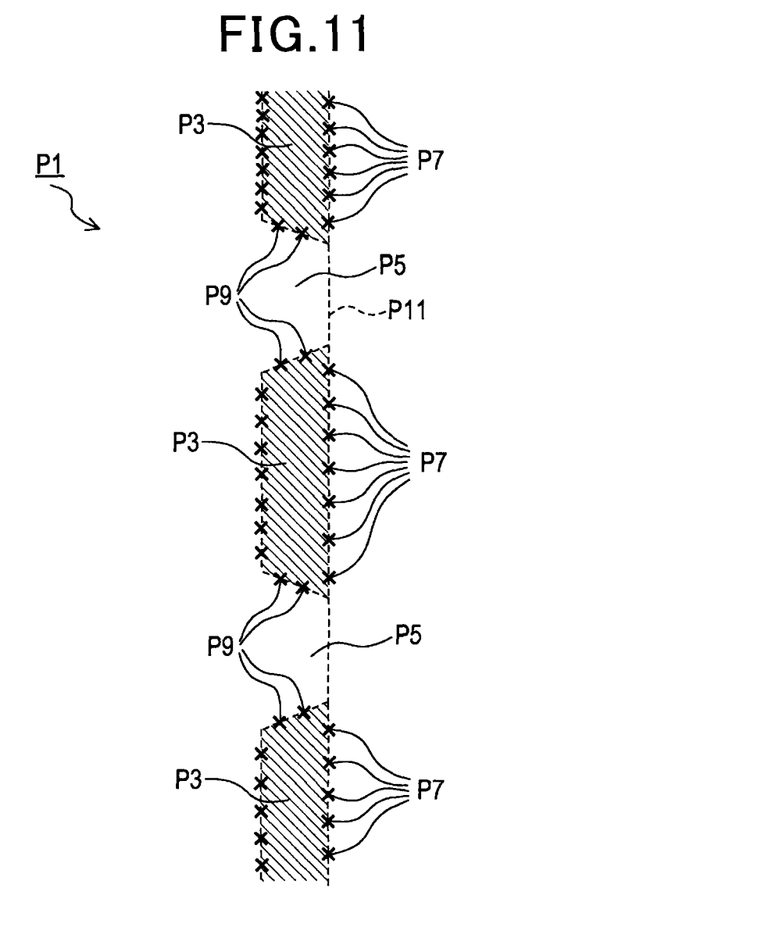
FIG. 11 is a schematic of recognizing a broken line using a prior art lane line recognition technique.

Various types of lane lines include a broken line P1 as shown in FIG. 11. The broken line P1 includes alternating unit line segments P3 and missing sections P5 along a travel direction (a vertical direction in FIG. 11). The unit line segments P3 have a constant width and a finite length along a longitudinal direction and have a color (e.g., white, yellow or the like) different from that of a portion of a roadway surface other than the lane line while the missing sections P5 have a color similar to that of a portion of the roadway surface other than the lane line.

When extracting the edge points in a captured image including the broken line P1, not only the edge points P7 located at both side of each unit line segment P3 along the longitudinal direction, but also edge points P9 facing each missing section P5. A lateral position of each edge point P9 (a position in a direction perpendicular the travel direction of the roadway) is away from lateral positions of the edge points P7.

A lane line recognized as the broken line P1 should be a lane line P11 passing through only the edge points P7. However, the presence of the edge points P9 may prevent accurate recognition of the broken line.

In consideration of the foregoing, exemplary embodiments of the present invention are directed to providing a lane-line recognition apparatus capable of accurately recognizing lane lines including a broken line.

SUMMARY

In accordance with an exemplary embodiment of the present invention, there is provided an apparatus for recognizing a lane line. The apparatus includes: an image capture unit configured to acquire an image of the surroundings including a roadway ahead of a subject vehicle (that is a vehicle mounting the apparatus); an edge-point extractor configured to extract edge points in the image; an first-edge-point detector configured to detect first edge points facing at least one missing section of a broken line in the edge points extracted by the edge-point extractor; and a lane-line recognizer configured to recognize a lane line using the edge points extracted by the edge-point extractor other than all or some of the first edge points.

With this configuration, the lane-line recognition apparatus recognizes the lane line using the edge points extracted in an edge-point extractor other than some of the first edge points (all or some of the first edge points), thereby providing accurate lane line recognition.

DESCRIPTION OF SPECIFIC EMBODIMENTS

With reference to the accompanying drawings, hereinafter are specifically described several embodiments of the present invention.

First Embodiment

1. Lane-Line Recognition Apparatus

Figure 1A:
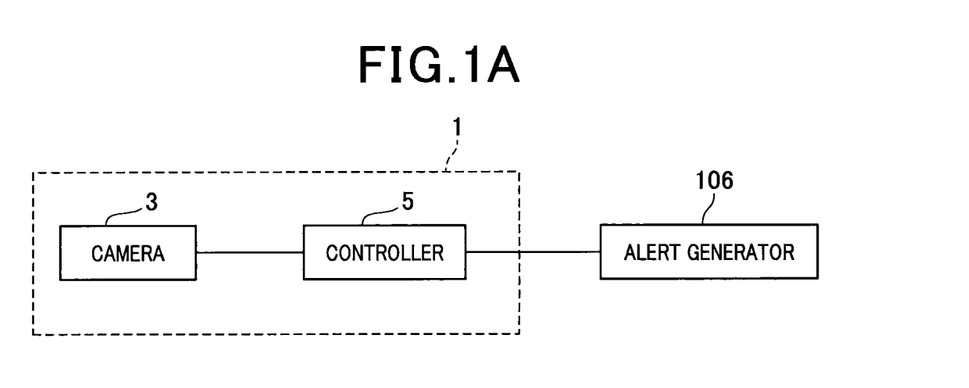
FIG. 1A is a block diagram of a lane-line recognition apparatus in accordance with a first embodiment of the present invention.

A lane-line recognition apparatus 1 in accordance with a first embodiment of the present invention will now be explained with reference to FIGS. 1 and 2. The lane-line recognition apparatus 1 is mounted in a vehicle (referred to as a subject vehicle) and configured to recognize lane lines, such as solid white lane lines, broken lines and the like). The lane-line recognition apparatus 1, as shown in FIG. 1A, includes a camera 3 (as an image capture unit) and a controller 5.

Figure 2:
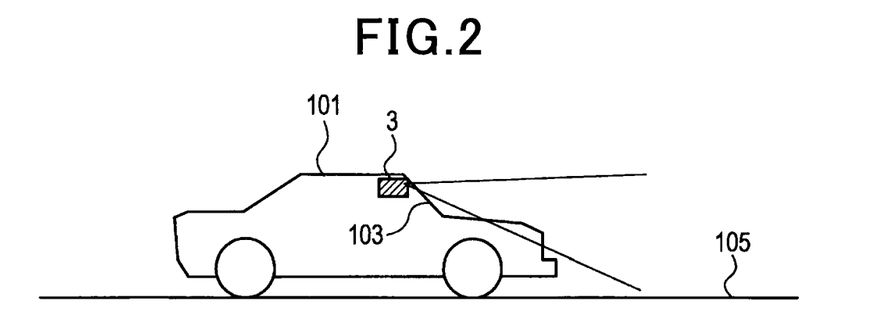
FIG. 2 is a side view of a vehicle-mounted camera.

As shown in FIG. 2, the camera 3 is disposed proximate a top end of a front windshield 103 and inside a passenger compartment of the vehicle 101 mounting the apparatus (hereinafter referred to as a subject vehicle). The camera 3 is configured to capture images of the surroundings including a roadway 105 ahead of the subject vehicle 101 and output data of the captured images to the controller 5.

The controller 5 is a well-known microcomputer including Central Processing Unit (CPU), Read Only Memory (ROM), Random Access Memory (RAM) and others, and is configured to execute processes described later using the images captured by the camera 3 to recognize lane lines. The controller 5 is configured to output information about the recognized lane lines to an alert generator 106.

The alert generator 106 is a device mounted in the subject vehicle 101 and configured to execute various processes using the information about the recognized lane lines received from the lane-line recognition apparatus 1. For example, the alert generator 106 is configured to determine the presence or absence of a risk of the subject vehicle 101 deviating from a lane line based on a distance from the subject vehicle 101 to the lane line, an angle between a longitudinal direction of the lane line and a travel direction of the subject vehicle 101, a speed of the subject vehicle 101 and others. When it is determined that there is a risk of the subject vehicle 101 deviating from a lane line, the alert generator 106 alerts a driver of the subject vehicle 101 via voice outputs, image display or the like, or performs automatic steering to prevent deviation of the subject vehicle 101 from the lane line.

Figure 1B:
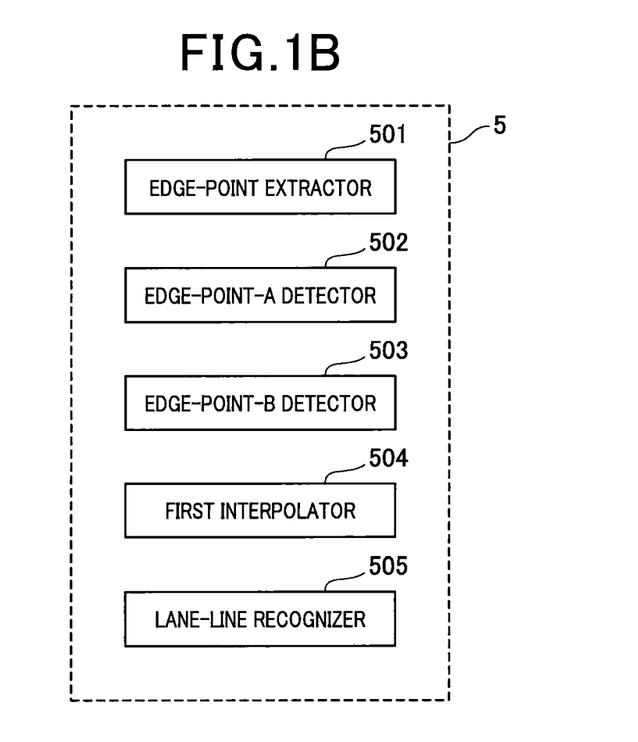
FIG. 1B is a block diagram of a controller of the lane-line recognition apparatus.

The controller 5, as shown in FIG. 1B, may include an edge-point extractor 501, an edge-point-A detector (as a first-edge-point detector) 502, an edge-point-B detector (as a second-edge-point detector) 503, a first interpolator 504, and a lane-line recognizer 505, which are implemented by the CPU executing computer programs respectively corresponding to these functional blocks 501-505 stored in the ROM or the like.

2. Lane-Line Recognition Process

A lane-line recognition process performed in the lane-line recognition apparatus 1 will now be explained with reference to FIGS. 3-6. This process is performed repeatedly every predetermined time interval.

Figure 3:
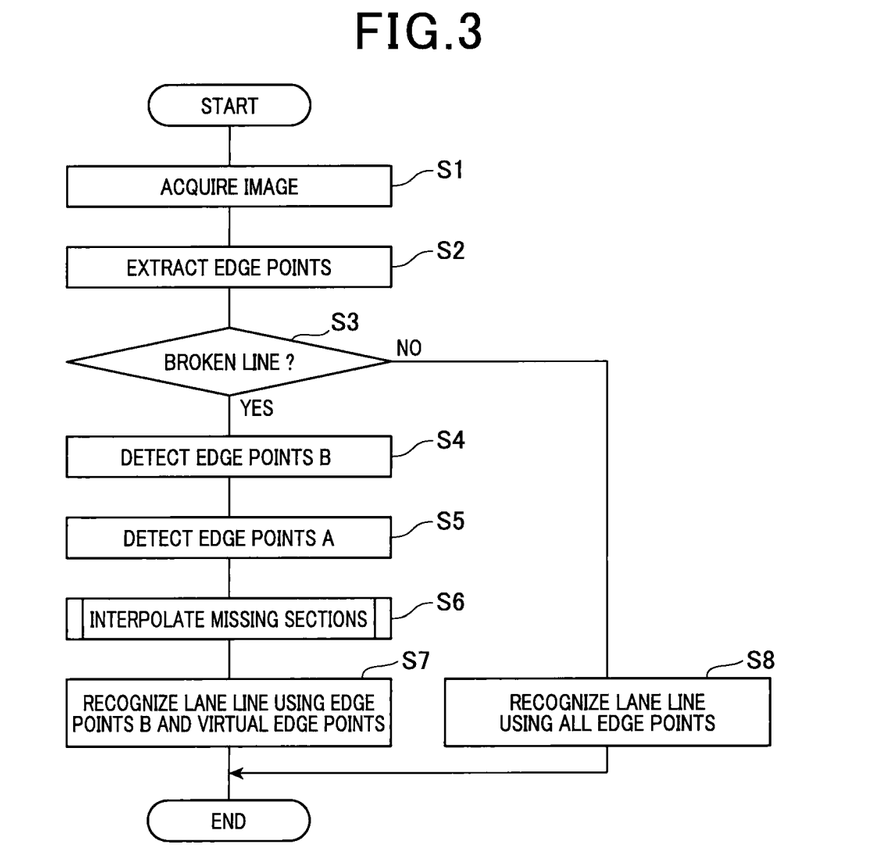
FIG. 3 is a flowchart of a process performed in the lane-line recognition apparatus.

In step S1, as shown in FIG. 3, the lane-line recognition apparatus 1 uses the camera 3 to acquire images of the surroundings including the roadway 105 ahead of the subject vehicle 101.

In step S2, the lane-line recognition apparatus 1 uses a differentiation filter for each horizontal line formed of a plurality of pixels (along which all the pixels take the same vertical coordinate value) in the image acquired in step S1 to calculate differential values. That is, for each horizontal line, a rate of change in luminance value is calculated for each pair of adjacent pixels along the horizontal line. Thereafter, for each differential value, it is determined whether or not the differential value is equal to or greater than a predetermined threshold. If it is determined that the differential value is equal to or greater than the predetermined threshold, then it can be considered that the luminance value significantly changes between the adjacent pixels of the pair corresponding to the differential value, and coordinate values of the pixels of the pair corresponding to the differential value are registered as an edge point 107A. This operation is repeated for all the pairs of adjacent pixels included in the image.

Figure 4A:
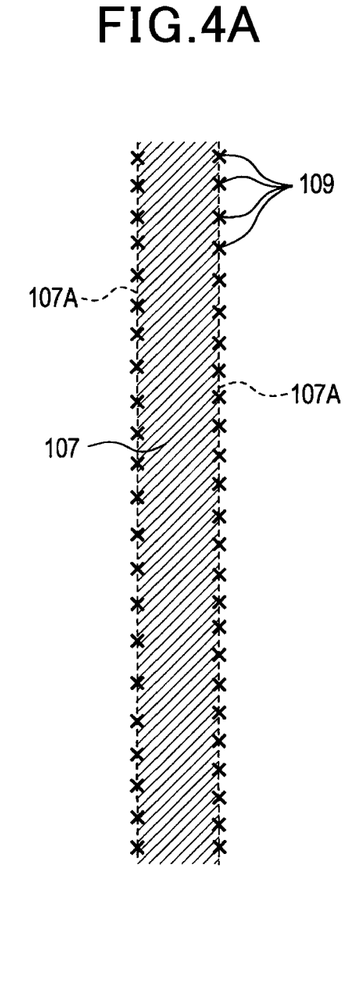
FIG. 4A is an example of edge points extracted for a solid lane line.

FIG. 4A shows edge points 109 extracted when a solid lane line 107 present in the acquired image. These edge points 109 are located at both sides 107A of the solid lane line 107.

Figure 4B:
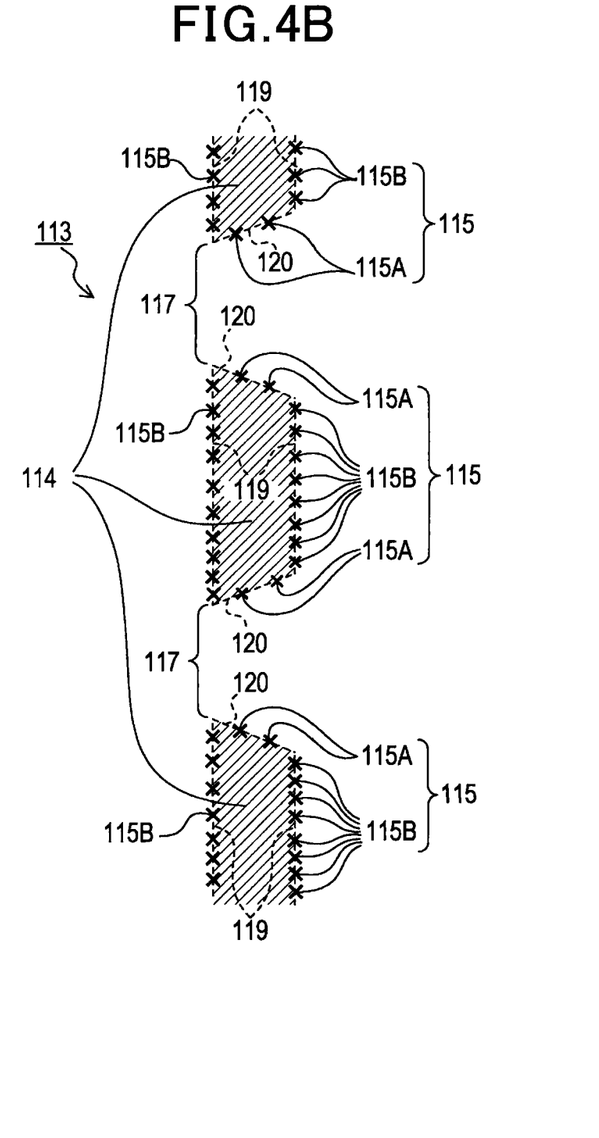
FIG. 4B is an example of edge points extracted for a broken line.
Figure 5:
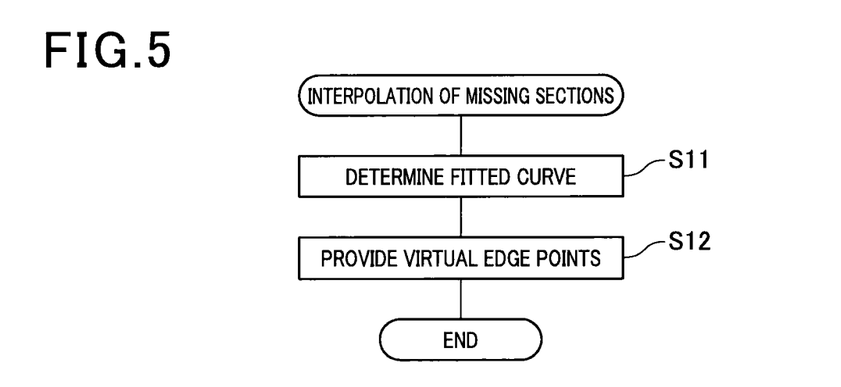
FIG. 5 is a flowchart of an interpolation process performed in the lane-line recognition apparatus.

FIG. 4B shows edge points 115 extracted when a broken line 113 is present in the acquired image. The broken line 113 includes alternating unit line segments 114 and missing sections 117. The unit line segments 114 have a constant width and a finite length along the longitudinal direction of the lane, and have a color (e.g., white, yellow or the like) different from that of the other area of the roadway surface than the lane line 113. The missing sections 117 have a color similar to that of the other area of the roadway surface than the lane line 113.

Edge points 115 are extracted along the perimeter of each of the unit line segments 114. The edge points 115 are classified into two categories: edge points 115A (as first edge points) and edge points 115B (as second edge points). The edge points 115A are located at opposing sides 120 of each unit line segment 114 with the opposing sides 120 facing one of missing sections 117. The edge points 115b are located at opposing sides 119 of each unit line segment 114 along the longitudinal direction (vertical direction or the travel direction in FIG. 4B) of the unit line segment 114.

The opposing sides of each unit line segment 114, facing one of the missing sections 117, are not necessarily parallel to the horizontal lines used to extract the edge points. The opposing sides of each unit line segment 114 may intersect the horizontal lines, where the luminance value may significantly change at intersections with the horizontal lines. This allows the edge points 115A to be extracted. As shown in FIG. 4B, the edge points 115A are away from a curve passing through the edge points 115B.

In step S3, the lane-line recognition apparatus 1 determines whether or not there is at least one broken line in the acquired image. More specifically, in the presence of a specific sequence pattern of edge points of the broken line, it is determined that the broken line present in the acquired image. In the absence of such a specific sequence pattern of edge points of the broken line, it is determined that no broken line is present in the acquired image. The specific sequence pattern of edge points of the broken line, as shown in FIG. 4B, may be a pattern in which sections (such as the sides 119 of the unit line segments 114) in which the edge points are spaced a small distance away from each other along a longitudinally extending curve alternate with sections of a predetermined length (sections corresponding to the missing sections 117) in which no edge points are present. If there is at least one broken line, then the process proceeds to step S4. If there is no broken line, the process proceeds to step S8.

In step S4, the lane-line recognition apparatus 1 detects, as the edge points 115B, the edge points forming the specific pattern as defined above in the edge points extracted in step S2.

In step S5, the lane-line recognition apparatus 1 detects the edge points 115A in the edge points extracted in step S2. More specifically, locations of the missing sections 117 are determined by detecting intervals of a predetermined length or more in which no edge points 115B are present. Thereafter, for each of the detected missing sections 117, the edge points facing the missing section 117 are detected as the edge points 115A.

In step S6, for each of the missing section 117, the lane-line recognition apparatus 1 interpolates between the edge points 115B at both ends of the missing section 117 with virtual edge points. This interpolation process will now be explained with reference to FIGS. 5 and 6. In step S11 of FIG. 5, as shown in FIG. 6, a fitted curve 121 passing through a maximum number of edge points 115B is calculated.

Figure 6:
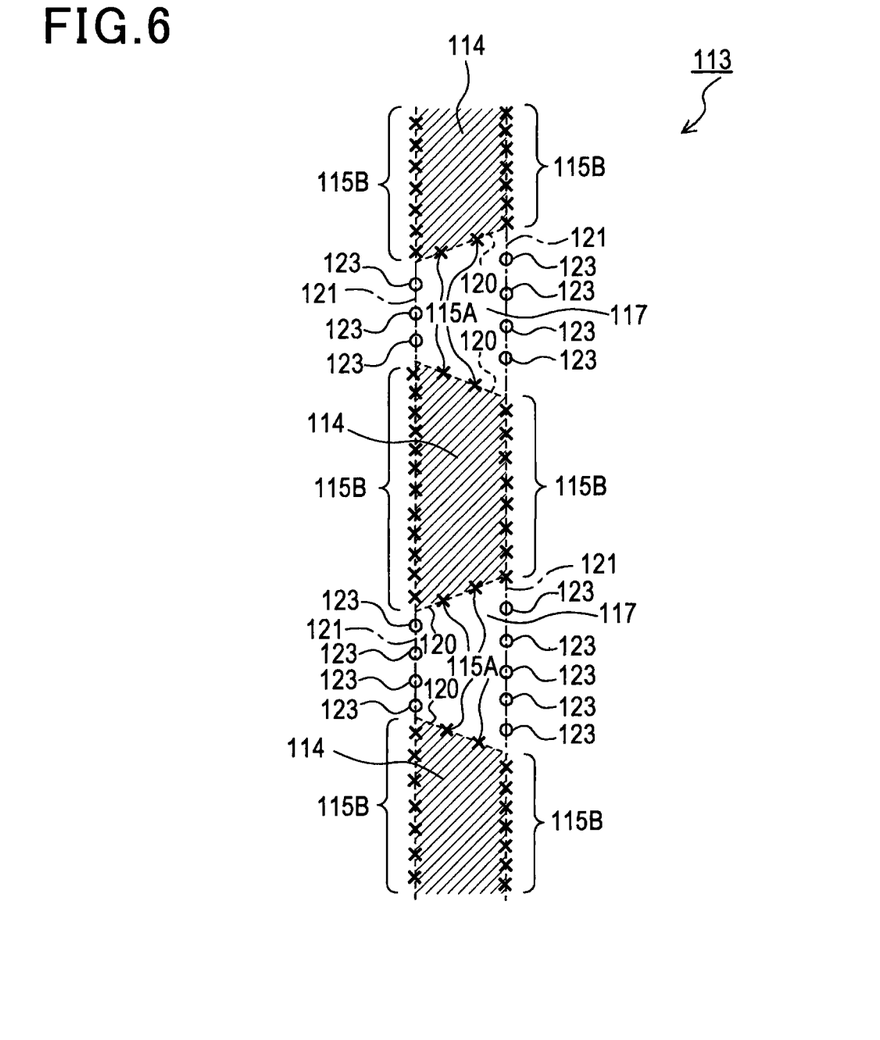
FIG. 6 is an example of a broken line recognized via the interpolation process.

In step S12, as shown in FIG. 6, the virtual edge points 123 are provided along portions of the fitted curve 121 passing through the missing sections 117 with the virtual edge points 123 spaced a predetermined distance away from each other.

Referring back to FIG. 3, in step S7, the lane-line recognition apparatus 1 recognizes the lane line using the edge points 115B and the virtual edge points 123. More specifically, the lane-line recognition apparatus 1 Hough-transforms the edge points 115B and the virtual edge points 123 to recognize a line passing through a maximum number of the edge points 115B and the virtual edge points 123 as the lane line. In step S7, the edge points extracted in step S2 other than the edge points 115A are used to recognize the lane line.

If it is determined that no broken line is present in the acquired image, then the process proceeds to step S8, where all the edge points extracted in step S2 are used to recognize the lane line.

That is, all the edge points extracted in step S2 are Hough-transformed, and a line passing through a maximum number of edge points is recognized as the lane line.

In the controller 5, the edge-point extractor 501 is responsible for execution of the operation in step S2, the edge-point-A detector 502 is responsible for execution of the operation in step S5, the edge-point-B detector 503 is responsible for execution of the operation in step S4, the first interpolator 504 is responsible for execution of the operation in step S6, and the lane-line recognizer 505 is responsible for execution of the operations in steps S7, S8.

3. Advantages (1) When recognizing the broken line, the lane-line recognition apparatus 1 uses the edge points other than the edge points 115A to recognize the lane line. Since, as shown in FIG. 4B, the edge points 115A are located away from a curve passing through the edge points 115B, use of the edge points including the edge points 115A to recognize the lane line may reduce recognition accuracy. Therefore, use of the edge points other than the edge points 115A to recognize the lane line will lead to accurate lane-line recognition.

(2) When recognizing the broken line, the lane-line recognition apparatus 1 interpolates, for each of the missing sections 117, interpolates between the edge points 115B at both ends of the missing section 117 with virtual edge points 123 and uses the edge points 115B and the virtual edge points 123 to recognize the lane line. This allows the lane line to be more accurately recognized.

Particularly, even in areas far away from the subject vehicle and having a small number of edge points 115B or on a curved roadway, the lane-line recognition apparatus 1 allows the lane line to be more accurately recognized.

Second Embodiment

1. Lane-Line Recognition Apparatus

Figure 9:
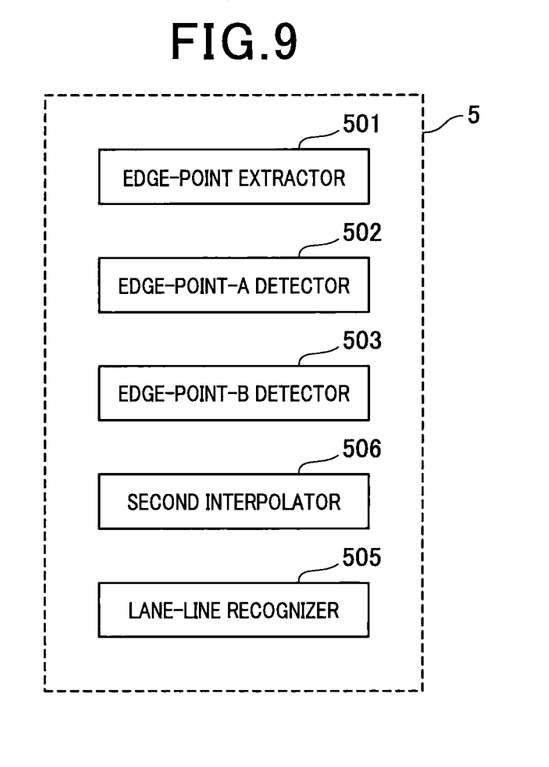
FIG. 9 is a block diagram of a controller of the lane-line recognition apparatus of the second embodiment.

A lane-line recognition apparatus 1 in accordance with a second embodiment of the present invention will now be explained. The lane-line recognition apparatus 1 of the second embodiment is similar in configuration to that of the first embodiment except that the first interpolator 504 is replaced with a second interpolator 506 (see FIG. 9) for the process of interpolating the missing sections in the controller 5.

2. Lane-Line Recognition Process

The lane-line recognition apparatus 1 of the present embodiment is configured to perform a similar process as in the first embodiment except for the process of interpolating the missing sections (see step S6 of FIG. 3) performed in the lane-line recognition apparatus 1. This difference of the present embodiment from the first embodiment will now be explained with reference to FIGS. 7 and 8. The lane-line recognition apparatus 1 of the present embodiment is configured to perform the process of interpolating the missing sections as shown in the flowchart of the FIG. 7.

Figure 7:
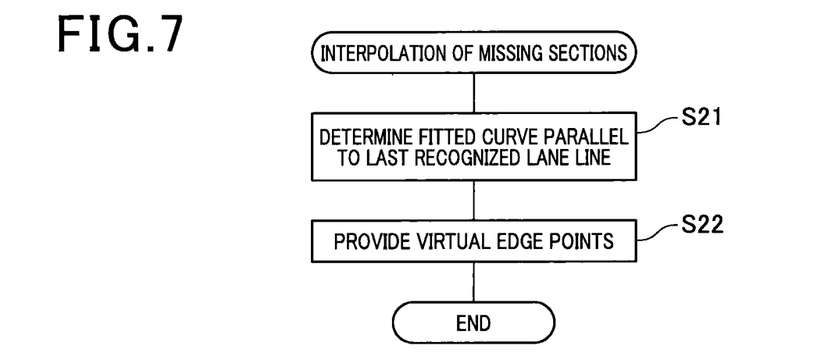
FIG. 7 is a flowchart of an interpolation process performed in a lane-line recognition apparatus in accordance with a second embodiment of the present invention.
Figure 8:
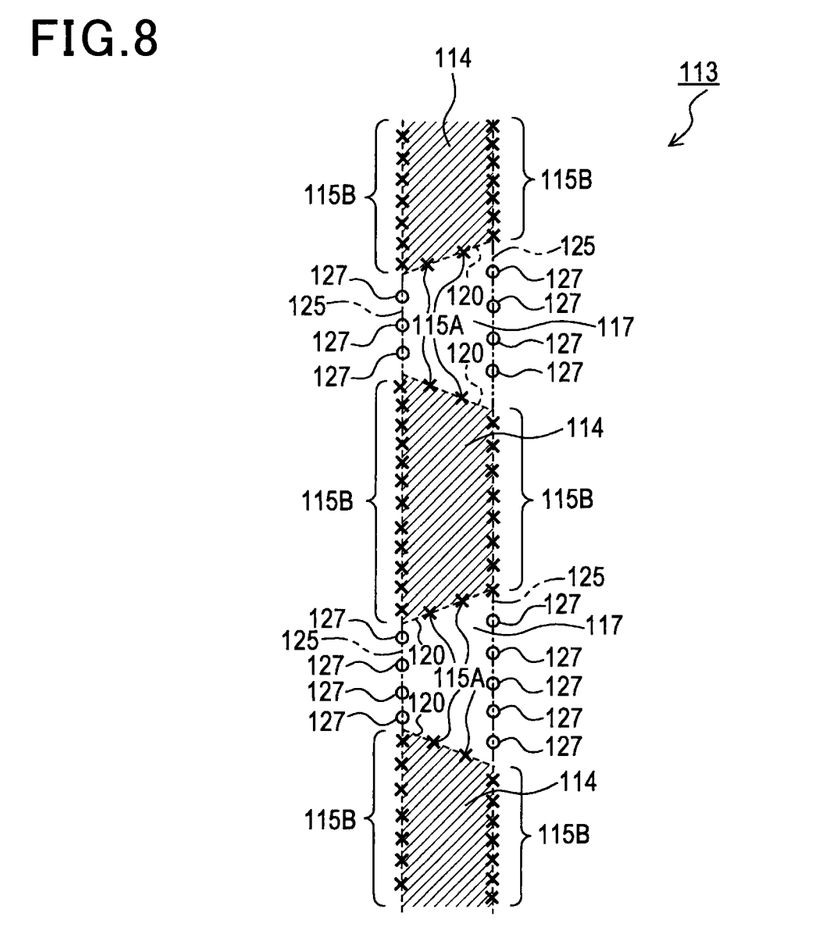
FIG. 8 is an example of a broken line recognized via the interpolation process of the second embodiment.

In step S21 of FIG. 7, as shown in FIG. 8, the lane-line recognition apparatus 1 connects the edge points 115B located at both ends of each missing section 117 by a curve 125 parallel to the last recognized lane line. In step S22, as shown in FIG. 8 the lane-line recognition apparatus 1 provides virtual edge points 127 spaced a predetermined distance away from each other along the curve parallel to the last recognized lane line. In the controller 5, the second interpolator 506 is responsible for execution of the operations in steps S21 and S22.

In the present embodiment, the lane line is recognized by using the edge points 115B and the virtual edge points 127 in the process of interpolating the missing sections. More specifically, the edge points 115B and the virtual edge points 127 are Hough-transformed. Then a line passing through a maximum total number of the edge points 115B and the virtual edge points 127 is recognized as the lane line.

3. Advantages (1) The lane-line recognition apparatus 1 of the present embodiment can provide similar advantages as in the first embodiment.

(2) The lane-line recognition apparatus 1 of the present embodiment uses the curve 125 parallel to the last recognized lane line in the process of interpolating the missing sections to provide the virtual edge points 127, which eliminates a need to determine or calculate the fitted curve 121. This can reduce a processing burden of the controller 5.

Third Embodiment

1. Lane-Line Recognition Apparatus

Figure 10:
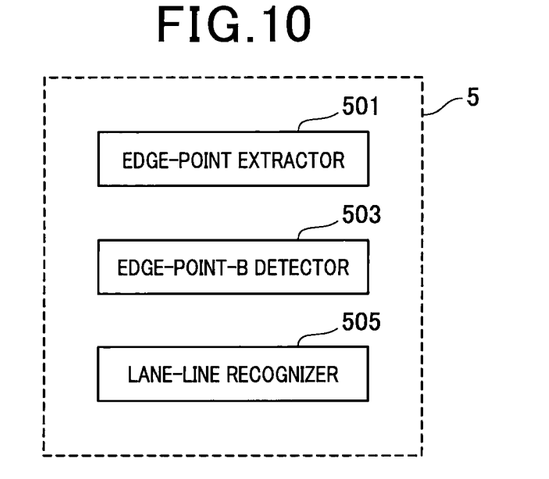
FIG. 10 is a block diagram of a controller of a lane-line recognition apparatus in accordance with a third embodiment of the present invention.

A lane-line recognition apparatus 1 in accordance with a third embodiment of the present invention will now be explained. The lane-line recognition apparatus 1 of the third embodiment is similar in configuration to that of the first embodiment except that the edge-point-A detector 502 and the first interpolator 504 are removed in the controller 5 (see FIG. 10).

2. Lane-Line Recognition Process

The lane-line recognition apparatus 1 of the present embodiment is configured to perform a similar process as in the first embodiment. In the present embodiment, the lane-line recognition apparatus 1 does not use the virtual edge points 123 to interpolate the missing sections 117, but uses the edge points 115B to recognize the lane line. That is, the edge points 115B are Hough-transformed. Then a line passing through a maximum number of edge points 115B is recognized as the lane line.

3. Advantages (1) The lane-line recognition apparatus 1 of the present embodiment can provide similar advantages as in the first embodiment.

(2) The lane-line recognition apparatus 1 of the present embodiment does not perform the process of interpolating the missing sections to provide the virtual edge points 123, which can reduce a processing burden of the controller 5.

Other Embodiments (1) In some alternative embodiments to any one of the first to third embodiments, some of the edge points 115A that are close to the edge points 115B may be used to recognize the lane line.

(2) In some alternative embodiments to the second embodiment, instead of the curve 125 parallel to the last recognized lane line, a curve parallel to the lane line recognized in the n-th previous cycle (n being a positive integer greater than one) may be used to provide the virtual edge points 127 in the interpolation process of the missing sections 117.

(3) In some alternative embodiments to any one of the first to third embodiments, a Kalman filter may be used in recognizing the lane line based on the edge points. In some alternative embodiments to the first embodiment, the Kalman filter may be used in determining the fitted curve 121.

(4) In some alternative embodiments to any one of the first to third embodiments, a likelihood of each edge point may be calculated and compared with a predetermined threshold. The edge points having the likelihood equal to or greater than the predetermined threshold may be used to recognize the lane line. In such an embodiment, the likelihoods of the edge points 115A may be lowered so as not be used in the process of recognizing the lane line.

(5) The first to third embodiments may be combined in whole or in part in configuration.

What is claimed is:

1. An apparatus for recognizing a lane line, comprising:
   an image capture unit configured to acquire an image of the surroundings including a roadway ahead of a subject vehicle;
   an edge-point extractor configured to extract edge points in the image based on differential values in luminance between horizontally adjacent pixels of the image;
   an edge-point detector configured to detect edge points facing at least one missing section of a broken line among the edge points extracted by the edge-point extractor; and
   a lane-line recognizer configured to recognize a lane line using the edge points extracted by the edge-point extractor other than all or some of the edge points detected by the edge-point detector.

2. The apparatus of claim 1, wherein
   the edge-point detector is referred to as a first-edge-point detector, and the edge points detected by the first-edge-point detector are referred to as first edge points,
   the apparatus further comprises:
   a second-edge-point detector configured to detect edge points located at both sides of a broken line along its longitudinal direction among the edge points extracted by the edge-point extractor, the edge points detected by the second-edge-point detector being referred to as second edge points; and
   an interpolator configured to interpolate edge points between the second edge points located at both sides of the at least one missing section,
   wherein the lane-line recognizer is configured to recognize the lane line using the second edge points and the interpolated edge points.

3. The apparatus of claim 2, wherein the interpolator is configured to determine a fitted curve to the second edge points and provide the interpolated edge points along the fitted curve.

4. The apparatus of claim 2, wherein the interpolator is configured to connect the second edge points at both sides of the at least one missing section with a curve parallel to the previous recognized lane line and provide the interpolated edge points along the curve.

* * * * *